UNITED STATES PATENT OFFICE 2,475,587

PHENOLIC RESINS

Howard L. Bender and Alford G. Farnham, Bloomfield, N. J., assignors to Bakelite Corporation, a corporation of New Jersey No Drawing. Application February 27, 1945, Serial No. 580,072

7 Claims. (Cl. 260—57)

This invention relates to phenolic resins and their preparation. In a copending application, Serial No. 527,988, filed March 24, 1944, which matured into Patent No. 2,464,207, there is disclosed the preparation of the six hydroxy-hydroxy'-diphenyl-methanes that when isolated are crystalline; and the products by following the crystal-forming procedure can be obtained free from unreacted phenols, formaldehyde, catalysts, by-products, etc., that have been found to be sources of difficulty in controlling the resin-forming reactions and the resin properties and in avoiding discoloration, and the like. There is further described the preparation of resinous chain and cross-linked compounds from the isomers, and it is to the phase of resin-formation that the present application is directed as a continuation-in-part of the aforesaid application.

In the direct reaction of phenol with formaldehyde, it has been determined that the substitution on the phenol ring tends to go first to the ortho position to form a methylol group which in turn reacts with a second phenol to give the diphenylol-methane; the next positions in the order of reactivity on the ring are the para and then the remaining ortho. It is possible by observing proper reaction conditions to thus obtain by the direct reaction of phenol and formaldehyde the three methanes: o,o'-, o,p'- and p,p'-diphenylol methanes. These methanes in turn can react with more formaldehyde, or they can react with formaldehyde and any other phenol with the separation of water, to produce resins consisting of multiple ortho- or para-methylene-chained phenols; the open positions of the o,p' and the p,p' isomer chains are generally ortho and occasionally para and of the o,o' isomer chains generally para, and these open positions are available for cross-linkage between chains to produce heat-reactive or hardening resins.

The 4,4' crystal structures are obtainable, for example, by the direct reaction of phenol and aqueous formaldehyde with hydrochloric acid as a catalyst, the phenol being present in excess of molar proportions, until a suspension of the reaction product in water occurs; crystals separate from the suspension on standing, and by distilling the crystals and recrystallizing from a toluene and butanol solution at room temperature, followed by a second recrystallization from butanol, pure crystals have been obtained that melt at 162–163° C., and have proven to be the 4,4' isomer. In the foregoing distillation of the crystalline fraction, a distillate passes over at 210°–215° C. at 2 mm. absolute pressure that yields crystals from a solution in butanol that are the 2,4' isomer. The 2,2' isomer formation is promoted by alkaline or neutral phenol-formaldehyde reaction conditions; the crystals can be obtained from a xanthone fusion with caustic potash and hydrogenation. The crystals have the following structures and properties:

|  | Melting point, °C. |
|---|---|
| Diortho (2,2') | 119 |

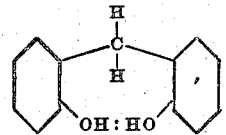

| | |
|---|---|
| Ortho-para (2,4') | 120 |

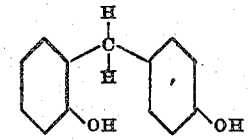

| | |
|---|---|
| Dipara (4,4') | 162 |

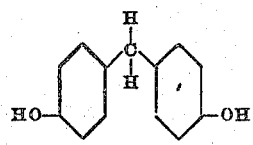

Solubility at 25° C. in benzene:

| | Gm./gm. benzene |
|---|---|
| Diortho | .033 |
| Ortho - para | .009 |
| Dipara | .001 |

Rapidity of hardening of the crystals to infusible resins:

| Reaction with | 2,2' | 2,4' | 4,4' | Phenol |
|---|---|---|---|---|
| 15% hexa at 160° C._____seconds__ | 60 | 240 | 175 | 165 |
| 1.5 mole formaldehyde and NaOH (1%) at 100° C._____minutes__ | 31 | 55 | 76 | 120 |
| 1.5 mole formaldehyde and NH₄OH (1%) at 100° C._____do____ | 9 | 78 | 66 | 73 |
| 1.5 mole formaldehyde and ZnO (1%) at 100° C._____do____ | 6 | 62 | 58 | 18 |

The 2,2' crystals distill at 315°–320° C. with some change to xanthene, the anhydride of the isomer, which proves the structure; the 2,4' crystals distill at about 330° C. with much decomposition and isomerization largely to the 4,4'; and the 4,4' crystals distill at about 336° C. with much decomposition and isomerization.

The above recited properties evidence considerable differences in the isomers dependent upon the position of the hydroxyl groups. Outstanding among them are the differences in the speed of reaction to the infusible resin state upon hardening with hexa (hexamethylenetetramine), the 2,2' isomer being four times as fast as the 2,4' isomer and three times as fast as the 4,4' isomer; by proper admixture of the isomers, it larly well into a chain formation due, it is believed, to the hydrogen-bonding energy (:) of the hydroxyl groups to leave open only the relatively sluggish second ortho positions (of the three positions in order of reactivity, ortho, para and ortho to the hydroxyls) in conformance to the structural formula:

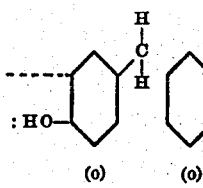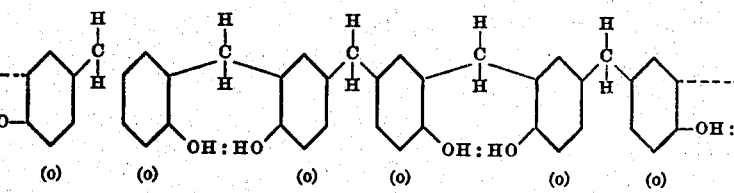

The 2,4' isomer cannot hydrogen-bond as well as the 4,4', and on test it was found to be slower in reaction with formaldehyde; this is indicated by the formula:

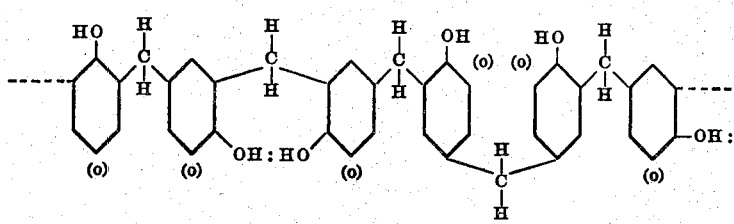

is possible, therefore, to control reaction speeds within the range of 60 to 240 seconds. The ammonia-catalyzed hardening reaction at 100° C. of phenol with formaldehyde shows a reaction speed intermediate between that of the 2,4' and 4,4' isomers, thereby indicating that the reaction goes through the 2,4' and 4,4' isomer stages with very little 2,2' isomer present; with zinc The 2,2' isomer in the reaction with formaldehyde shows a still more difficult condition for forming hydrogen-bonded rings; but it does leave open in the chain the much more active positions that are para (p) to the hydroxyls to give a markedly increased speed in subsequent hardening (cross-linking) reactions as shown by the formula:

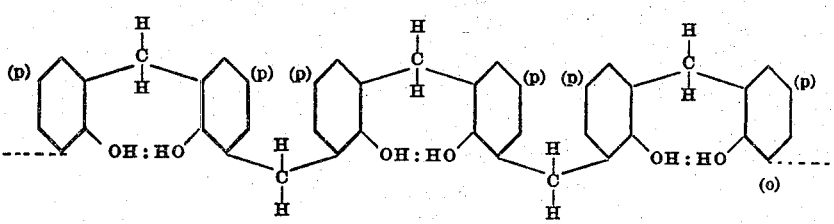

oxide as the catalyst, however, the phenol-formaldehyde reaction at 100° C. evidently goes through the rapid 2,2' stage to arrive at a hardening speed of more than three times that of either the 2,4' or the 4,4' isomers.

The isolated crystals provide standards for checking resinous products obtained in the condensations of phenols and aldehydes or ketones; and resins made from the crystals insure absence of contaminants and exact duplication in the resin properties of different batches. In the production of resins, however, it is not usual or necessary to isolate the crystals and then proceed with further reaction of crystals with formaldehyde to form resinous chain structures; after the controlling conditions have been determined, a resin chain formation of any particular type can be brought about by continuing the initial condensation to a resin stage under conditions yielding the fusible or novolak type resin, such as the presence of excess phenol, acid catalyst, etc., and chain-structure resins are formed of a length depending on the continuance of the condensation reaction.

The reactivity rate of crystals with formaldehyde in making the chain or novolak resin intermediate structures has been found to differ with each isomer. In explanation, the 4,4' isomer upon reaction with formaldehyde fits particu- In other words, the 4,4' isomer is fastest in the condensation with formaldehyde into a chain structure, but the 2,2' chain structure is by far the speediest in cross-linking by a hardening agent; the hardening-reaction speeds of the crystalline isomers as given in the foregoing table support the structural explanation.

It has been determined that a convenient indicator of the structures is that of bromination. By reacting phenol with an excess of potassium bromide-bromate for 2 hours at 50° C. it was found that 4.65 bromine atoms unite instead of the usual 3 atoms (tribromphenol test). Pure reference materials—benzene, diphenyl, diphenyl-methane and orthohydroxy-diphenyl-methane —were used for establishing bromine values for the phenyl ring, the bonding methylenes and the ortho-mono-hydroxy-phenyl ring; actual bromine values under the same conditions were also obtained for the diphenylol-methanes and of the chain-structure resins made from them by reaction with formaldehyde. As a result a phenol resin can be brominated and from the rate of bromination an average value can be obtained that points to its ortho or para structure or admixture proportions. For pure crystalline compounds the data enables a calculation of the bromination per mole and for all its parts, such as the para-hydroxy-phenyl ring; but for resins the results are better expressed per phenyl ring or as bromine used per gram of resin sample as shown in the following table, in which the "ultimate" bromine number is the number of cubic centimeters of N bromine per gram of the sample per 120 minutes at 50° C., and the "gram-atoms per mole" is the $$\frac{\text{"ultimate" number}}{2000} \times \text{molecular weight}$$

TABLE I

*Bromination values*

| Substance | "Ultimate" Bromine Number | Gram Atoms per Mole |
|---|---|---|
| Phenol | 98.8 | 4.65 |
| Parabenzylphenol | 59.5 | 5.47 |
| Orthobenzylphenol | 51.2 | 4.71 |
| Diphenyl-methane | 25.3 | 2.13 |
| Benzene | 4.6 | 0.18 |
| Diphenyl | 14.1 | 1.09 |
| 2, 2'-Diphenylol-methane (crystals) | 64.0 | 6.40 |
| 2, 4'-Diphenylol-methane (crystals) | 86.0 | 8.64 |
| 4, 4'-Diphenylol-methane (crystals) | 101.0 | 10.11 |
| Resin (six rings) from 2,2' | 51.2 | (¹) |
| Resin (six rings) from 2,4' | 55.2 | |
| Resin (six rings) from 4,4' | 57.4 | |

¹ The uncertainty of the molecular weights of resins makes the gram atoms per mole of no significance.

From the bromination values then it appears that the 4,4' crystals have the greatest reactivity with bromine, using approximately 4 atoms of bromine per mole more than the 2,2' crystals in the same reacting time and the 2,4' crystals are of intermediate reactivity. This is explainable on hydrogen-bonding taking place in the 2,2' isomer crystal, for that interferes with the bromination of the methylene group; the chaining of the 2,2' isomer cannot further influence this factor, since the isomer itself has all its possible hydrogen-bonding. In comparison the 4,4' isomer crystal presents no possibility of hydrogen-bonding, and it is therefore active to bromine; the chaining of the 4,4' isomer, however, causes hydrogen-bonding and so a reduction in bromine activity.

That products permitting hydrogen-bonding, such as the 2,2' structures, have an accelerated rate of reaction with hardening agents for cross-linking and a corresponding retarded rate of bromination is of real practical importance in controlling resin reactions. In this connection it has been found that high cross-linking speed begins for chain or novolak resins that test at an ultimate bromine number of 55.0 or approximately 2.2 grams of bromine added to each gram of resin, and that the hardening-reaction speed increases as the bromine number becomes less. It has also been determined that the high cross-linking speeds are largely independent of the resin chain lengths; resins are thus obtainable that can pass from a very fluid or high flow condition to infusible gels in a fraction of a minute at 160° C.

Factors governing the crystal structure and the novolak chain formation in the order of decreasing importance are: catalysts, temperature, contaminants, the measurable pH, ratio of reactants, reaction time period, and exposure to air or oxygen.

In general a pH ranging from 4 to 7 is more favorable to structural control by means of catalysts and other conditions; such a pH value is obtained by adding a small amount (1%) of a base to a phenol-formaldehyde mixture, which without added catalyst and made of pure reactants has a pH of about 4.5. The presence of impurities, such as ammonium formate resulting from the presence of formic acid and its reaction with ammonia, that do not register on the pH scale can drastically change the structure of the resin produced. One effect of working with a fairly neutral pH range is the slowness of the initial condensation, and this permits a high temperature (above 135° C.) that is found to favor the 2,2' structure formation. Catalysts suitable for high temperature reactions are zinc, magnesium and aluminum oxides that only become active at high temperatures as slow resinification or chain-forming catalysts of the methanes initially formed; the critical temperature is about 150° C. In contrast, traces of acid, such as hydrochloric acid, favor the 4,4' isomer formation and cause rapid reaction so that resin chain intermediates begin to form by the time 100° C. is reached. With either basic or acid catalysts, the 2,4' isomer is also formed, the percentage being dependent on conditions; for instance, reducing the reaction temperature with basic catalysts increases the 2,4' formation, and likewise ammonium and sodium hydroxides give increased yields of the 2,4' isomer.

The presence of a large excess (15 to 30% or more) of the phenol over the 1:1 molar ratio at the start of the initial condensation of a phenol and formaldehyde (or equivalent) is likewise an aid in directing the formation of the 2,2' structure. After the reaction has begun, the excess phenol can be distilled off in condition for reuse. The reuse of the distilled pure phenol greatly reduces the percentage of impurities added by fresh charges of commercial phenol and formaldehyde, which impurities seem to favor the production of the 2,4' and 4,4' structures.

Substituted phenols in their reaction with formaldehyde are similarly subject to control, the extent and rate of reactivity being modified by the reactive positions available for reaction; for instance, meta-cresol and meta-xylenol, having the three reactive positions open, are much like phenol in reaction speed and the control of the resin chain structure. Substituted aldehydes and ketones tend toward the formation of crystalline structures of the 4,4' type with acid catalysts and these are hardenable with formaldehyde, para-formaldehyde, hexa, and similar hardening agents.

Under conditions of high reaction temperature and light metal oxide catalyst most of the ortho positions on the phenyl rings are reacted in the condensation and chain formation and the highly reactive para positions left largely unreacted, in contrast to the novolak resin-forming processes heretofore followed (utilizing acid catalysts and low temperatures) that favor reaction at one of the ortho positions and the para position to leave open the sluggish second ortho position for hardening resinification. The effect of this change is that, while the condensation and resin chain formation are relatively slow, the hardening or cross-linking in a molding operation is extremely rapid. The hardening or gelation time is further subject to control by the amount of hardening agent, such as hexa, that is added to the novolak resin intermediate and by the temperature; for example, the time to gel at 150° C. of an intermediate resin largely of the 2,2' structure dropped from 60 seconds to about 30 seconds as the percentage of hexa added was increased from 5 to 12%.

The phenolic resin chain intermediates, particularly the 2,2' structural type, are somewhat difficult to process by standard technical methods of rolling the resin with wood flour and a low concentration of hexa between hot rolls because the fluidity of the resin causes weakness in the sheet; a maximum strength of the sheet was reached at about 10 to 14% of hexa addition. The viscosity of molding material so produced is higher than the usual run of material, the molding pressure required increasing with the hexa content up to about 14%, and additional hexa above this amount then acts as a plasticizer to increase flow; mostly, however, the increase in molding pressures is required because of the high speed of cure in order to close the mold rapidly and give full pressure on the material before the resin sets or loses flow. The speed of cure with hexa added is outstanding, a Rossi-Peakes flow tester showing the set time to be about 50 seconds at 150° C. when 10 to 12% of hexa was used; bottle caps were cured in condition for discharge at 150° C. in about 30 seconds with a 12% hexa content, and this is the shortest set-time commercially available so far for two-step resins (i. e. novolak resins having hardener added). The hot discharge of the molding material also is accelerated by the "hot-inflexibility" and in this respect is superior to other phenolic materials. The combination of fast cure and hot-inflexibility has long been sought by the molding industry.

*Example 1.*—A high 2,2' novolak resin (about 60% 2,2' and 40% 2,4') was made by charging a still with

| | Pounds |
|---|---|
| Phenol | 949.0 |
| Formalin (37.5% formaldehyde) | 126.5 |
| Zinc oxide | 3.2 |

The still contents were heated to reflux (113°–115° C.) for 2.5 hours and then to 160° C., allowing water to distill off; it was held at 160/ C. for 30 minutes, vacuum applied and the mass steam-distilled. In the distillation about 70% of the phenol was recovered for reuse; and 276 pounds of resin obtained with less than 0.5% of free phenol present. The resin was tested by distillation and melting point and found to have about 60 per cent of the 2,2' structure. Upon mixing the resin with 55 pounds of formalin and 2.7 pounds of zinc oxide and repeating the reaction, a novolak chain resin was obtained with a melting point of 185°–195° F. (85°–90° C.), and it was very brittle on cooling; its bromination value was 52, and it hardened with 10–15% of hexa in 30–20 seconds or about twice as fast as a typical commercial resin characterized as a high-speed hardening resin.

A molding material was made from—

| | Pounds |
|---|---|
| Resin (ground to 8–20 mesh) | 42 |
| Hexa (16% on resin) | 6.7 |
| Lime | 3.0 |
| Stearic acid | 1.5 |
| Pigment | 5.0 |
| Wood flour | 41.8 | by ball-milling the ingredients with the exception of the wood flour; when thoroughly mixed the wood flour was added and ball-milling was continued until the mixture had a uniform appearance; the mixture was then compounded on hot rolls (230°–260° F.) for about 1–1.5 minutes to flux and somewhat react the resin and hexa for improving flow and molding properties. The sheets were cooled and ground to 16 mesh powder.

*Example 2.*—A resin high in the 4,4' structure was made by mixing phenol, 100 pounds (1+ mole), aqueous formaldehyde (37.5%), 70 pounds (0.87 mole), oxalic acid, 1 pound, and reacting for 4 hours at 100° C.; the mass was dehydrated by heating to 140° C. The resin upon mixing with 10–15% of hexa and heating to 160° C. became infusible in about 50–40 seconds, and it had a bromination value of 62. A molding material was made from the resin as in the preceding example.

Comparative tests were made on the molding materials of Examples 1 and 2, a molding pressure of 2200 pounds per square inch and a mold temperature of 320° F. being used; since the molded pieces were test pieces, they were allowed to remain in the molds until fully cured. The following properties were noted:

| | Example 1 | Example 2 |
|---|---|---|
| Tensile strength, p. s. i | 7,965.000 | 7,900.00 |
| Flexural strength, p. s. i | 11,348.000 | 11,025.00 |
| Impact stre: gth, ft. lbs | 0.332 | 0.36 |
| Dielectric strength, volts/mil | 272.000 | 284.00 |
| Water absorption—24 hr. immersion boiling water per cent | 5.890 | 6.84 |

*Example 3.*—A molding material was made from the 2,2' crystals by admixing 15 per cent of hexa, and 42 parts of the mixture was ball-milled with 58 parts of wood flour. The mixture required no hot rolling, since it had more than enough flow for filling a mold; in fact it was so free-flowing that merely contact pressure (1 to 10 pounds per square inch) at molding temperature was sufficient for molding. The composition of this example is differentiated in being free from impurities and agents affecting the molding process and properties in the molded articles; constancy in these respects is thereby assured.

For many molding purposes where the high speed of cross-linking that characterizes the resin of Example 1 is not demanded, the resin is particularly useful as an addition or component of the other one-step and two-step phenolic resins for improving flow in a mold, increasing the rate of hardening and for imparting hot-inflexibility; such additions are also useful in improving release from a mold as this property also characterizes the resin of Example 1. Minor additions (25%) of the resin to a slow speed hardening resin have been found to so improve the latter in these respects as to make it superior to commercial one-step high speed resins.

What is claimed is:

1. Process of preparing fusible novolak resins from formaldehyde and a phenol having three reactive positions and selected from the group consisting of meta-cresol, meta-xylenol and phenol which comprises reacting at refluxing temperatures an excess molar quantity of the phenol with formaldehyde at a pH between 4 and 7 and in the presence of a metal oxide catalyst selected from the group consisting of zinc, magnesium and aluminum to form a mixture of diphenylol methanes, dehydrating the reaction mass, and then heating the diphenylol methanes to a temperature between 135° and 160° C. to chain the diphenylol methanes into resinous intermediates characterized by open para positions in the phenol rings for cross-linking with a hardening agent.

2. Process of preparing fusible novolak resins from formaldehyde and a phenol having three reactive positions and selected from the group consisting of meta-cresol, meta-xylenol and phenol which comprises reacting at refluxing temperatures and at a pH between 4 and 7 an excess molar quantity of the phenol with formaldehyde in the presence of a metal oxide catalyst selected from the group consisting of zinc, magnesium and aluminum to form a mixture of diphenylol methanes, dehydrating the reaction mass, then heating the diphenylol methanes to a temperature between 135° and 160° C. to chain the diphenylol methanes into resinous intermediates characterized by open para positions in the phenol rings for cross-linking with a hardening agent and then distilling off excess unreacted phenol.

3. Process of preparing fusible novolak resins from formaldehyde and a phenol having three reactive positions and selected from the group consisting of meta-cresol, meta-xylenol and phenol which comprises reacting at refluxing temperatures and at a pH between 4 and 7 an excess molar quantity of the phenol with formaldehyde in the presence of a metal oxide catalyst selected from the group consisting of zinc, magnesium and aluminum to form a mixture of diphenylol methanes, dehydrating the reaction mass, heating the diphenylol methanes to a temperature between 135° and 160° C. to chain the diphenylol methanes into resinous intermediates characterized by open para positions in the phenol rings for cross-linking with a hardening agent, distilling off excess unreacted phenol, reacting additional formaldehyde with the resinous intermediate in proportion to yield a novolak resin until a brittle resin at room temperature is formed.

4. Process of preparing a molding material which comprises reacting formaldehyde with a phenol having three reactive positions and selected from the group consisting of meta-cresol, meta-xylenol and phenol which comprises reacting at a pH between 4 and 7 and at refluxing temperatures an excess molar quantity of the phenol with formaldehyde in the presence of a metal oxide catalyst selected from the group consisting of zinc, magnesium and aluminum to form a mixture of diphenylol methanes, dehydrating the reaction mass, heating the diphenylol methanes to a temperature between 135° and 160° C. to chain the diphenylol methanes into resinous intermediates characterized by open para positions in the phenol rings for cross-linking with a hardening agent, distilling off excess unreacted phenol, reacting additional formaldehyde with the resinous intermediate in proportion to yield a novolak resin until a brittle resin at room temperature is obtained, admixing the resin with molding material filler and sufficient hardening agent to impart heat hardenability to the resin.

5. A novolak reaction product of formaldehyde and a phenol selected from the group consisting of phenol, meta-cresol, and meta-xylenol, said resin being essentially methylene chained diphenylol methanes, and a major proportion of said methanes being 2,2'-diphenylol methane.

6. Phenol-formaldehyde novolak resin, being essentially methylene chained diphenylol methanes, each phenylol group having at least one active position available for cross-linking by a methylene engendering hardening agent, and a major proportion of said methanes being 2,2'-hydroxy-hydroxy'-diphenyl methane, said resin being characterized by an ultimate bromine number less than 55.

7. Molding material comprising molding material filler, a methylene engendering hardening agent and a novolak resin of phenol and formaldehyde, said resin being essentially methylene chained diphenylol methanes, each phenylol group having at least one active position available for cross-linking by a methylene engendering hardening agent, a major proportion of said methanes being o,o'-diphenylol methane, and said resin having an ultimate bromine number less than 55.

HOWARD L. BENDER.
ALFORD G. FARNHAM.

REFERENCES CITED

The following references are of record in the file of this patent:

UNITED STATES PATENTS

| Number | Name | Date |
|---|---|---|
| 1,580,424 | Ellis | Apr. 13, 1926 |
| 1,955,731 | Bender | Apr. 24, 1934 |

FOREIGN PATENTS

| Number | Country | Date |
|---|---|---|
| 359,826 | Germany | Sept. 27, 1922 |
| 673,828 | Germany | Mar. 29, 1939 |

OTHER REFERENCES

Megson, Jour. Soc. Chem. Ind. (Apr. 1939), pages 131–139.